Oct. 27, 1964  W. M. WALKER  3,154,337
CHOKER HOOK
Filed Aug. 5, 1963  2 Sheets-Sheet 1
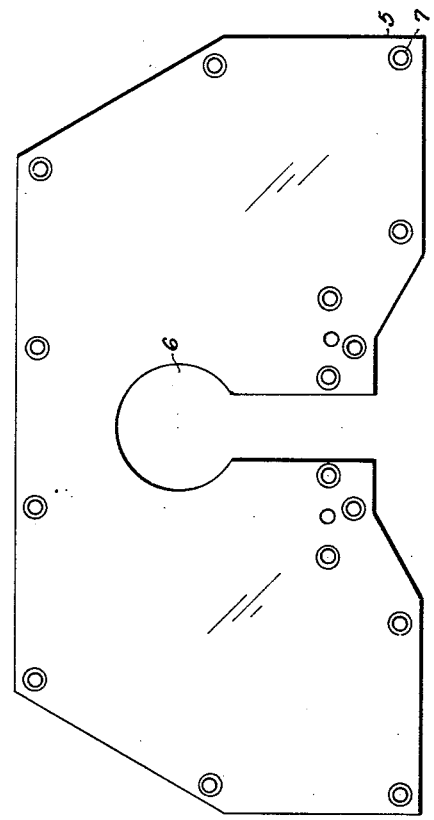
Fig. 10.
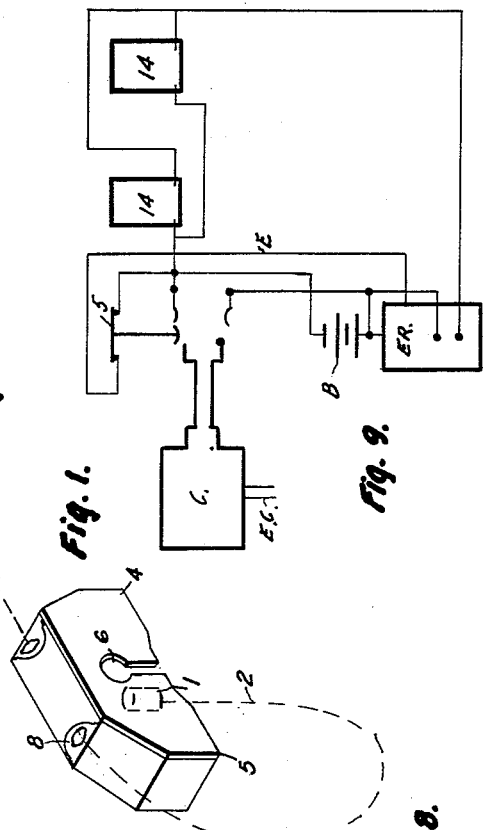
Fig. 9.
Fig. 1.
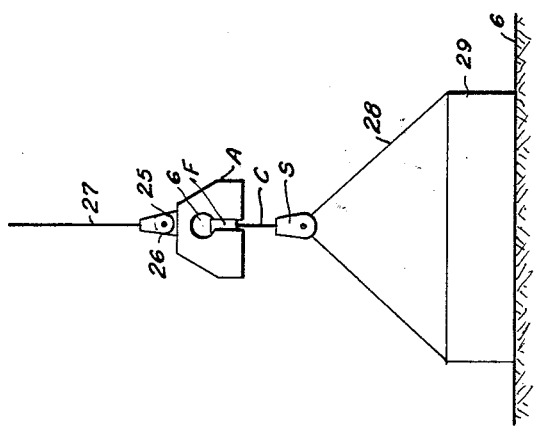
Fig. 7.
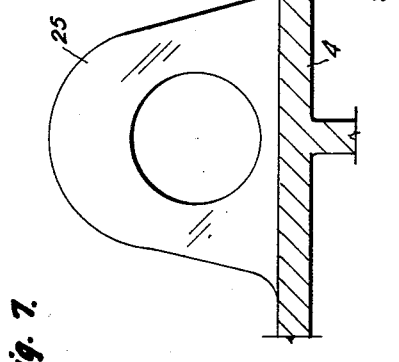
Fig. 8.
William M Walker
Inventor Oct. 27, 1964 W. M. WALKER 3,154,337
CHOKER HOOK
Filed Aug. 5, 1963 2 Sheets-Sheet 2
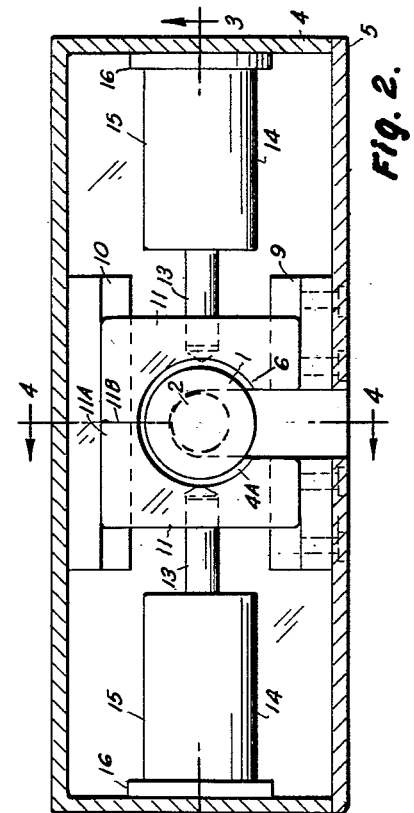
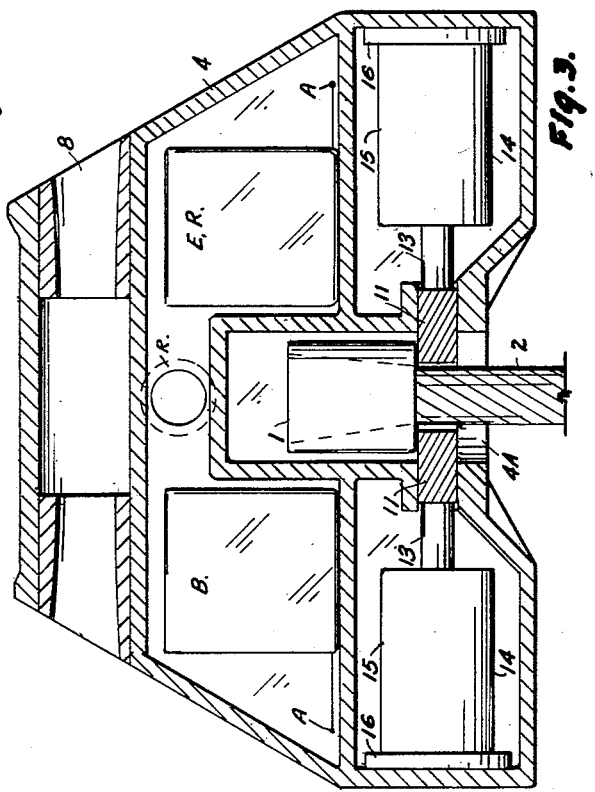
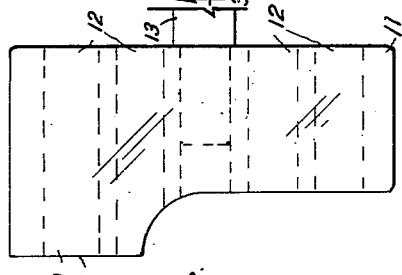
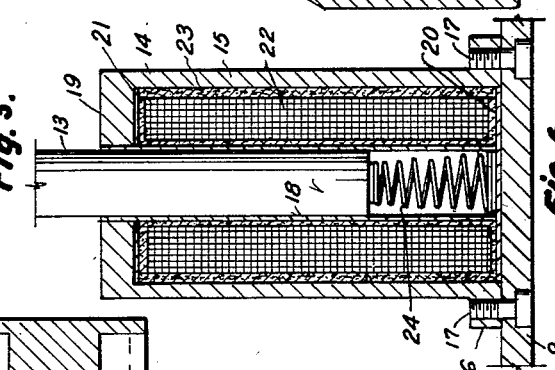
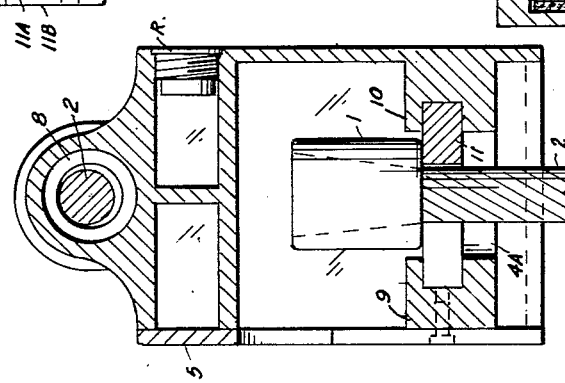
William M. Walker
Inventor

United States Patent Office 3,154,337
Patented Oct. 27, 1964

3,154,337
CHOKER HOOK
William M. Walker, 5611 SE. 117th, Portland, Oreg.
Filed Aug. 5, 1963, Ser. No. 300,021
2 Claims. (Cl. 294—75)

This application is a continuation-in-part of my application for a Choker Hook filed June 4, 1962, Ser. No. 205,477, now Patent No. 3,104,909.

This invention also relates to choker hooks used in the logging industry and particularly to those hooks in which the ferrule is released by remote control.

The principal object of my invention is to be able to unhook a choker without making the operation a manual one.

Another objective is to be able to unhook a choker through the agency of a radio frequency oscillator signal to an electronic relay in a receiver carried by the choker hook.

Another objective is to be able to release the ferrule through a bottom opening in a choker hook.

A further objective is to provide means for supporting the choker ferrule within the hook which includes a pair of oppositely disposed chocks adapted to be withdrawn from beneath the ferrule to permit said ferrule to drop through or be pulled through the bottom of the choker hook.

Over the years many choker hooks have been invented, among them the "Bardon" version which has become the standard in the logging industry. This hook employs a length of cable (wire rope) to each end of which is socketed a cylindrical ferrule. The choker hook itself (so called in the parlance of the industry) is a hollow casting, usually of manganese steel, provided with a T-shaped opening in one side thereof through which one of the ferrules may be entered and seated with the cable protruding through the bottom of the hook. In other words, a seat is formed within the hook which prevents the ferrule from being pulled out through the bottom of the hook. To release the ferrule the same must be pushed up and out through the opening through which was entered. A passage is provided in the upper end of the hook through which the cable is passed prior to socketing the other ferrule thereon.

At the landing enough slack must be pulled to release the ferrule. To pull the slack and remove the ferrule from the hook is a difficult time-consuming job. This job requires the services of a man whose pay is $25.00 per day at the present rate. One may say that another objective is to save this $25.00. However, this man's pay is not the only saving, for a "Cat" or a "Donkey" is tied up while the log is being released. With my invention no time is lost at the landing and no time is lost in releasing the log.

So far my choker hook has been described particularly for use in the logging industry. However, it may be adapted for use in the building industry. And again, it may be used in military operations or rescue work wherein supplies may be dropped from a helicopter and released from the helicopter without someone having to be at the ground.

FIG. 1 of the accompanying drawings shows the relationship of the choker and the choker hook as the choker might be looped around a log; FIG. 2 is a horizontal section through the choker hook casing showing the relationship of the choker hook casing, chocks, and the operating solenoids therefor; FIG. 3 is a vertical section on the line 3—3 of FIG. 2; FIG. 4 is a vertical section on the line 4—4 of FIG. 2; FIG. 5 is an enlarged plan view of a chock; FIG. 6 is an enlarged section on a centerline of an operating solenoid; FIG. 7 shows a case of supplies being dropped from a helicopter (the helicopter not being shown); FIG. 8 shows the choker hook provided with an eye for use when dropping supplies; FIG. 9 is a diagram of the electric circuit which supplies the operating solenoids; FIG. 10 is a plan view of the cover plate.

Throughout the drawings and the specification similar numerals refer to similar parts.

In this application each chock is directly connected to and operated by a solenoid.

The drawings show the choker-casing so formed as to provide a loop for engaging a log as shown in FIG. 1, while FIG. 8 shows a choker hook provided with an eye. In both of these adaptations my remote control radio frequency operated chock-releasing means is used. Many deviations and arrangements may be made from the structure shown and described without departing from the basic idea. Therefore, I do not limit my invention to the exact disclosures but extend it to all that comes fairly within the scope of the appended claims.

Choker cables are made from ½ to 1¼" 8/19 plough steel wire rope, the size and length depending upon the timber being logged. The wire rope used in the building and military trades would depend upon the weight of the supplies being dropped or lifted.

The cylindrical ferrules socketed on each end of the cable, range from 1¼" x 2" to 2¼" x 3½". How these ferrules are socketed on the cables with lead or babbitt is so well known to those skilled in the art as to require no further description.

As previously pointed out, FIG. 1 shows the relationship of the elements as a choker is looped around a log. This general relationship is also present when a "Bardon" hook is used. FIG. 1 shows the ferrule 1 socketed on one end of the choker 2 (cable) and the ferrule 3 on the opposite end of said choker 2 for reception in the ferrule-receiving means carried by the "Cat" or the "Donkey" rigging (none being shown). FIG. 1 shows the ferrule 1 entered within the choker hook casing 4. The side wall or cover plate 5, having a T-shaped slot 6 therein, is secured to the casing 4 by the screws 7 and is thus removable from the casing 4 to permit interior milling of said casing 4 and for assembling other units within the casing.

FIGS. 1, 3, and 4 show the ferrule 1 in position within the choker casing 4 with the choker 2 depending therefrom. FIGS. 1, 3, and 4 also show the choker hook casing 4 provided with a passage 8 in the upper portion thereof for the choker 2 positioned therein before the ferrule 3 is socketed thereon.

The interior of the choker casing 4 is compartmented and faced so that the cover plate 5 may form a tight seal to keep out dirt and water through which the choker hook is often dragged.

Attached to the cover plate 5 is the way 9, and formed integral with the casing 4 is the way 10. See FIG. 4. These ways, 9 and 10, are milled for the reception of the chocks 11 which are a sliding fit in said ways, 9 and 10. Each chock is substantially L-shape in configuration. The short legs 11a, of each chock 11 are positioned adjacent one another to form a substantially U-shape structure adapted to straddle the choker 2 beneath the ferrule 1 to provide support for said ferrule 1 when the same is resting upon the chocks 11. See FIGS. 2, 3 and 4.

The chocks 11 are preferably made of a hard stainless steel and lightened by the holes 12 therein. See FIG. 5. Without illustration, it may be pointed out that the chocks 11 may be made of aluminum with the contacting faces thereof faced with stainless steel.

Each chock 11 is directly connected to the steel plunger 13 of a direct current solenoid 14, the connection being made by a press fit. See FIG. 2.

The solenoid 14 shown has an open ended coil casing 15, flanged at 16 for contact with the choker casing 4 and held thereto by the cap screws 17. A brass tube 18 has one end thereof press fitted into the closed end 19 of the coil casing 15 into which said tube extends into contact with the brass disc 20 positioned against the choker casing 4. A similar brass disc or washer 21 is perforated to fit over the tube 18 and lie against the closed end 19 of the coil casing 15. A bobbin-wound coil 22 surrounds the tube 18 and is spaced from the surrounding coil casing 15 to allow for a suitable waterproof insulation 23 to enclose the coil 22.

Between the end of the floating plunger 13, within the tube 18, and the brass disc 20 is a compression spring 24 whose function is to automatically keep the adjacent faces 11B of the short legs 11A of the chocks 11 in contact, unless said short legs 11 are deliberately held apart through action of the solenoids 14.

The electric current to supply the solenoids 14 is furnished by the battery B which is of the nickel-cadmium type rechargeable when needed. A receptacle R adapted to be connected with the charger C is carried by the choker hook casing 4. FIG. 9 shows a diagram of the electric circuit E in which are shown the two solenoids, the battery B, the switch S, and the electronic relay receiver ER. When the battery charger C is connected to a source of A.C. current as EC and to the receptacle R, the switch S is opened removing current from the electronic relay in the receiver ER and permitting said current to flow into the battery B. When not being charged, current from the battery B flows through the switch S and then back to energize the electronic relay in the receiver ER. The "Cat" operator or one of the other workmen carries a remote control oscillator (not shown). This is a small transistorized radio-frequency oscillator operating in the citizens band. When a push button is depressed on the oscillator, current flows from a self contained battery to a crystal and transistor permitting a signal to be transmitted. When the electronic relay in the receiver ER receives a signal from the remote oscillator, contacts close which permits current to flow to the solenoids 14.

The antenna A for the receiver ER is shown as an open loop of insulated wire positioned within the choker hook casing 4 but, like other commercial elements, may be of other suitable form for a particular choker hook.

It is to be noted that the battery B, the battery charger C, the switch S, and even the oscillator (not shown), are commercially available and hence have not been minutely described.

It is also to be noted that the "Cat" operator is usually present when a choker 2 is being applied to a log and has control of the oscillator to spread the chocks 11 so that the ferrule 1 may be entered within the choker hook casing 4. When the ferrule 1 is within the choker casing 4, the chocks 11 are automatically brought together through action of the springs 24.

When my choker hook is used in dropping supplies in military operations, it is provided with an eye 25 formed on the choker hook casing 4 as shown in FIG. 8 to which a suitable shackle 26 on the helicopter lowering line 27 may attach. In the operation just cited the ferrule F, adapted to be supported by the chocks 11, is shown connected to the material sling 28 through the agency of the short cable C and the shackle S. See FIG. 7.

The instant the material 29 being lowered touches the ground G any slack will raise the ferrule F from its seat on the chocks 11 and permit the helicopter operator to give the signal for the solenoids 14 to spread the chocks 11 and to permit the ferrule F to drop out through the bottom 4a of the choker hook casing 4. When a log is dropped, the tendency of the ferrule 1 in the choker hook casing 4, is to rise and when it does, even a fraction of an inch, the chocks 11 are free for movement by the solenoids. It may be pointed out that a log may be raised and dropped a number of times until the chocks 11 are freed of any load resting upon them.

Having described my invention and how it works, I claim:

1. In a logging device, in combination; a choker having a ferrule on both ends thereof; a choker hook having a hollow casing formed with an opening therethrough for the passage of the choker, a side wall having a T-shaped opening therethrough for the entry of a ferrule into the casing, a bottom portion of said casing having a bottom opening therethrough through which the ferrule can pass; a separable ferrule support positioned above the bottom opening which includes oppositely disposed substantial L-shaped elements the short leg of each element being positioned adjacent each other to form a substantially U-shaped structure adapted to straddle the choker beneath the ferrule resting upon said elements; a solenoid having a movable plunger directly connected to each L-shaped element adapted to move the elements apart to permit the ferrule to drop through the bottom opening beneath and out of the choker casing when the solenoids are energized; means to energize the solenoids which includes a battery, a radio frequency oscillator and an electronic relay in a receiver, said relay being operable upon a signal from the oscillator to control the flow of current from the battery to the solenoids; and a spring behind the plunger of each solenoid adapted to move the L-shaped elements together when current to the solenoids is cut off.

2. In a logging device in combination with a length of cable having a ferrule on one end thereof and a shackle on the opposite end; a hook having a hollow casing, a shackle-engaging means, a side well having a T-shaped opening therethrough for the entry of the ferrule into the casing, and a bottom portion of said casing having an opening therethrough through which the ferrule can pass out of the casing; a separable ferrule support positioned above said bottom opening which includes oppositely disposed substantially L-shaped elements the short leg of each element being positioned adjacent each other to form a substantially U-shaped structure adapted to straddle the cable beneath the ferrule resting upon said elements; a solenoid having a movable plunger directly connected to each L-shaped element adapted to move the elements apart to permit the ferrule to drop through the bottom opening beneath and out of the hook when said solenoids are energized; means to energize the solenoids which includes a battery, a radio frequency oscillator and an electronic relay in a receiver, said relay being operable upon a signal from the oscillator to control the flow of current from the battery to the solenoids; and a spring behind the plunger of each solenoid adapted to move the L-shaped elements together when current to the solenoids is cut off.

References Cited in the file of this patent
UNITED STATES PATENTS 2,607,621    Pulvino _____ Aug. 19, 1952
3,104,909    Walker _____ Sept. 24, 1963